E. NICHOLSON.
Road Gate.
No. 80,992.
Patented Aug. 11, 1868.
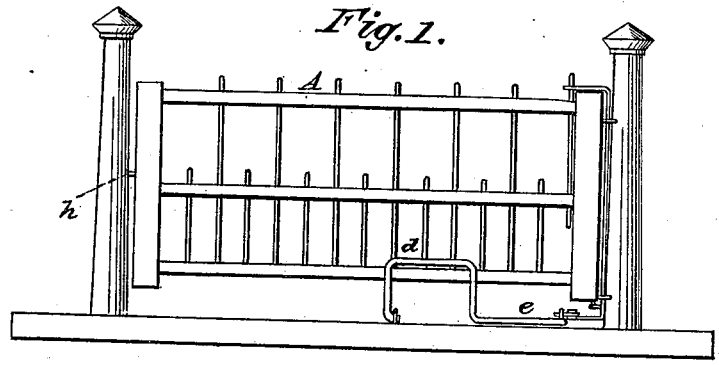
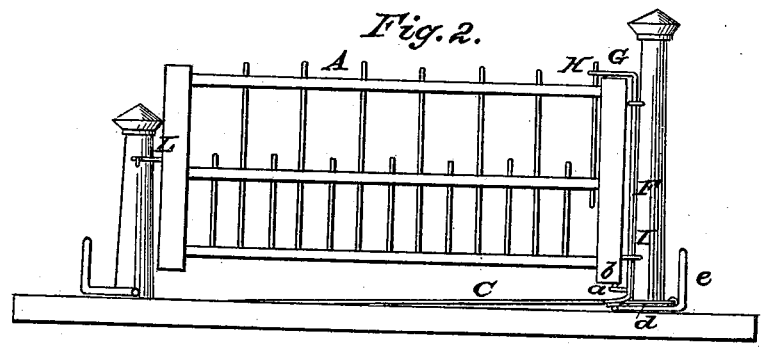
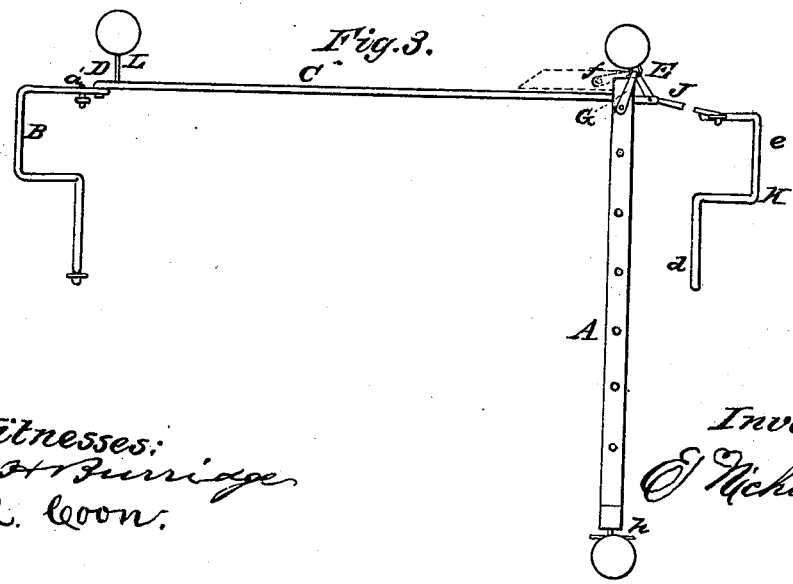
Witnesses:
W. H. Burridge
A. Coon.
Inventor:
E. Nicholson

United States Patent Office.

E. NICHOLSON, OF ROCKPORT, OHIO.

Letters Patent No. 80,992, dated August 11, 1868.

IMPROVEMENT IN ROAD-GATES.

*The Schedule referred to in these Letters Patent and making part of the same.*

TO ALL WHOM IT MAY CONCERN:

Be it known that I, E. NICHOLSON, of Rockport, in the county of Cuyahoga, and State of Ohio, have invented certain new and useful Improvements in Road-Gates; and I do hereby declare that the following is a full and complete description of the same, reference being had to the accompanying drawings, making part of this specification, in which—

Figure 1 is a front view of the gate when closed.
Figure 2 is a view when open.
Figure 3 is a top view when closed.
Like letters of reference refer to like parts in the different views.

A represents the gate, which may be of the ordinary construction. It is designed for a carriage-road to be operated by the wheels of the carriage as it passes.

B K are the starting-bars, which are situated at each side of the gate, at such a distance that the gate may be opened before the horse reaches it. These starting-bars, which are to be operated by the wheels of the carriage, are of the shape shown in the drawings, and are connected to the gate in the following manner:

The bar B, which is secured in place by eye-bolts, or other suitable means, is hinged to the connecting-rod C, as shown at D. The end of the bar being pivoted at a point $a'$, forms a lever, the short arm of which operates the connecting-rod C. This rod is pivoted to the arm E, of the shaft F, the arm G of the shaft being pivoted to the gate at H. At the bottom of the gate is a point, $a$, which rests in a socket, $b$, which socket is attached to the gate-post I, thus allowing the gate to swing on the point $a$.

J is also a connecting-rod, by means of which the starting-bar K operates the gate in the same manner as by the bar B, which is done as follows, viz:

As the carriage strikes the upright portion $d$, of the starting-bar K, in approaching the gate, the weight of the wheel will lower it, thereby raising the other portion $e$, of the bar, to which the connecting-rod J is attached; this impels the rod forward, forcing the arm E around, and the arm G to the position indicated by the dotted lines $f$, fig. 3, thereby throwing the gate from the perpendicular line, or the top to one side, the bottom being stationary or swinging in a stationary socket $b$; this will raise the gate from the catch $h$, when it will quickly swing around to its centre of gravity or perpendicular line. It thus swings around, and is caught on the catch L, opening the way for the carriage, and is held back by the catch until the wheels strike the upright part of the starting-bar B, which operates the rod C, and throws the upper part of the gate to the opposite side, which raises it from the catch L, and when it swings around, the force it acquires in swinging forces it over the catch $h$.

This improvement is applicable to both single and double gates.

What I claim as my improvement, and desire to secure by Letters Patent, is—

Pivoting the gate at $a$, and to the arm G, in combination with the shaft F and arm E, operated by means of the starting-bars and rods, as and for the purpose set forth.

E. NICHOLSON.

Witnesses:
W. H. BURRIDGE,
E. E. WAITE.